United States Patent [19]

Geus et al.

[11] 4,057,704

[45] Nov. 8, 1977

[54] GAS SHIELDED ARC WELDING TORCH

[75] Inventors: Ewald Geus, Blasbach; Vesa Tammi, Giessen, both of Germany

[73] Assignee: Alexander Binzel Corporation, Germany

[21] Appl. No.: 635,339

[22] Filed: Nov. 26, 1975

[30] Foreign Application Priority Data

Nov. 29, 1974 Germany .............................. 2456478
Sept. 24, 1975 Germany .............................. 2542470

[51] Int. Cl.$^2$ ............................................ B23K 9/32
[52] U.S. Cl. ...................................... 219/75; 219/130; 219/136
[58] Field of Search .................. 219/74, 75, 130, 136

[56] References Cited

U.S. PATENT DOCUMENTS

| | | | |
|---|---|---|---|
| 3,239,647 | 3/1966 | Irniger | 219/74 X |
| 3,283,121 | 11/1966 | Bernard et al. | 219/130 |
| 3,536,888 | 10/1970 | Borneman | 219/130 |
| 3,783,233 | 1/1974 | dal Molin | 219/130 |

*Primary Examiner*—J. V. Truhe
*Assistant Examiner*—N. D. Herkamp
*Attorney, Agent, or Firm*—Hill, Gross, Simpson, Van Santen, Steadman, Chiara & Simpson

[57] ABSTRACT

A gas shielded arc welding torch with a working nozzle end including a nozzle seat having first a conically shaped outer surface decreasing towards the working end, a push on gas nozzle adapted to be received on the nozzle seat from the working end thereof and projecting beyond the working end thereof, the nozzle having an expandible section adapted to overlie the nozzle seat in tight engagement therewith, and constricting means resisting expansion of the nozzle.

12 Claims, 5 Drawing Figures

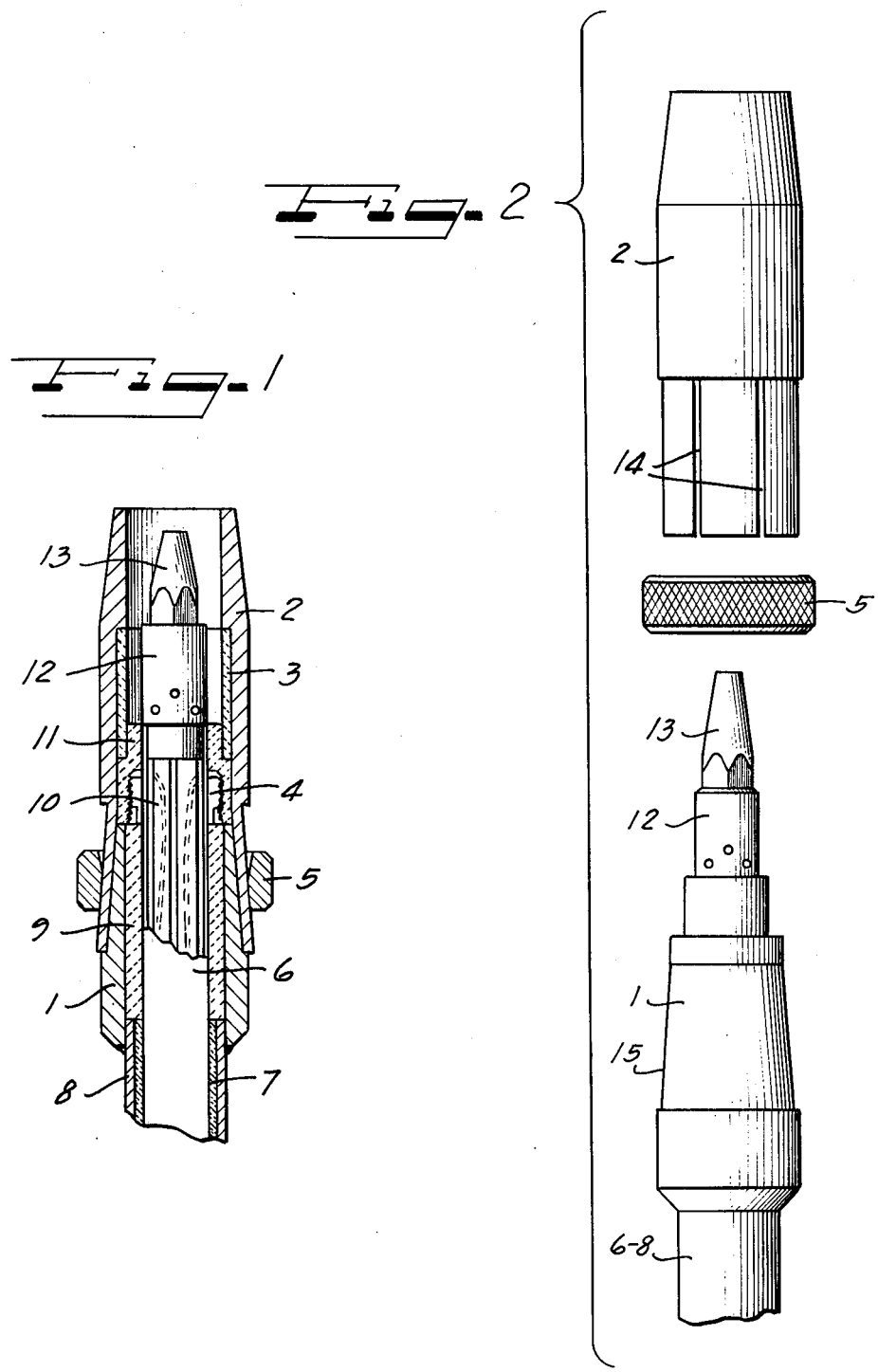

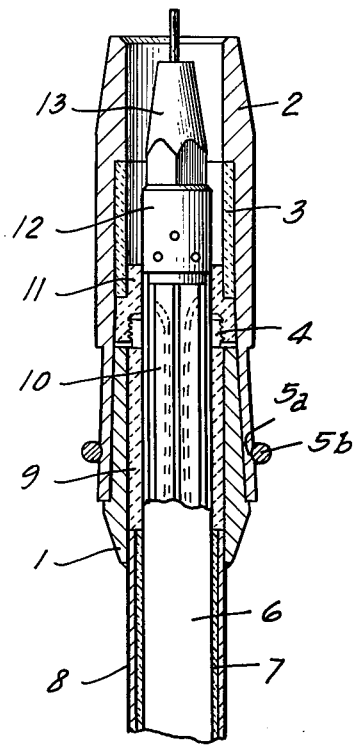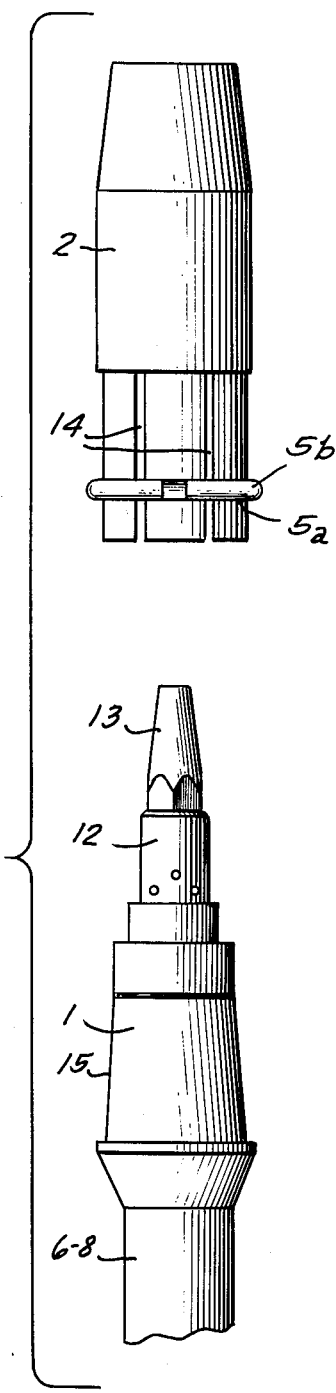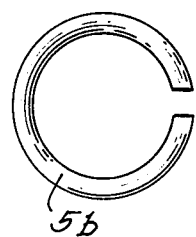

4,057,704

GAS SHIELDED ARC WELDING TORCH

BACKGROUND OF THE INVENTION

1. Field of the Invention

This invention relates to a welding torch with gas shielding and a gas nozzle. More specifically this invention relates to a metal-inert-gas (MIG) or a metal-active-gas (MAG) welding torch essentially with a gas nozzle, a gas nozzle seat or receptacle, a torch tube, and a cable assembly.

2. Prior Art

Until now in the electrical welding art it was usual to fix the gas nozzle on a gas nozzles seat. Said gas nozzle as well as said gas nozzle seats were cylindrical in their inner and outer cross section surfaces. The necessary attachment of the gas nozzle at or on this gas nozzle seat was accomplished in well known manner by means of clamps, clamping devices, or cramp-frames, or with corresponding screw-threads. In such devices it was common to insulate the gas nozzle seat on its outer side surface. This insulation had to be provided against the current carrying part of the torch tube, to avoid short-circuits. As insulating material asbestos and comparable materials have been used.

It is a disadvantage, however, that only reduced current capacities are possible with this kind of insulating material using electrical gas shielded welding, as otherwise the insulating material will be demolished too fast. Even in the use of gas nozzles of newest design the limits of efficiency of such prior art systems of gas nozzles and gas nozzle seats are very small. Besides that, the heat transfer in such systems was always insufficient. Furthermore the attachment of the gas nozzles at or on the gas nozzle seat was unpractical and prone to trouble.

SUMMARY OF THE INVENTION

An object of this invention is to provide a MIG/-MAG-welding torch, which avoids these disadvantages and provides better current insulating, a more efficient heat transfer, as well as greater current capacity especially when using gas nozzles of newest design, in the electrical welding of endless wire electrodes under gas shielding.

This object is solved according to this invention by a MIG/MAG-welding torch with a gas nozzle a gas nozzle seat, a current carrying torch tube, and a cable assembly, which comprises: a) a conically shaped gas nozzle seat which is tapered or reduced towards its front end, b) a gas nozzle to be pushed-on to the conically shaped gas nozzle seat, which has at the rear end and in its longitudinal direction expansion slits and c) a ring to press the pushed-on gas nozzle on the gas nozzle seat.

In one embodiment of the invention this ring is a movable straining or clamping ring, which passes the gas nozzle onto the gas nozzle seat by moving the ring towards the rear or enlarged end of the gas nozzle.

In another prefered embodiment of the invention this ring is a spring ring.

The spring ring consists preferrably of usual spring steel of round or rectangular cross-section. The thickness of a suitable ring will be normally 2 to 4 mm.

The spring ring can be placed loose and movable on the nozzle tube and, after the gas nozzle has been placed on the gas nozzle seat, be pushed towards the rear end of the gas nozzle, so that the gas nozzle is tightened against the gas nozzle seat.

The manufacturer will preferably fix, however, the spring ring on the gas nozzle. Thus a constricting force is always acting on the rear end of the gas nozzle in the area of the expansion slits. If the gas nozzle is mounted on the gas nozzle seat, its slitted end will be expanded against the spring ring, the force of which reliably tightens the mounted gas nozzle.

In an especially preferred embodiment, the gas nozzle has at its end, in the area of the expansion slits, a groove in which the spring ring rests.

Normally the spring ring consists of steel, which shall be preferably chrome-plated to prevent welding spatters from burning into the spring steel.

In an especially preferred embodiment of the invention the gas nozzle seat has an inner insulator which is placed between the torch tube and the gas nozzle seat.

In combination with a watercooled torch tube this inner insulation can consist advantageously of ceramics or comparable materials. Such an insulating material provides not only the electrical insulation of the gas nozzle and its seat from the current carrying parts of the torch, but also allows the desired heat transfer from the gas nozzle to the inside towards the watercooled part of the torch.

For an aircooled torch tube this inner insulation can preferably consist of asbestos material. In this case heat insulation of the uncooled part of the torch in addition to the electrical insulation of the gas nozzle and its seat (receptacle) against the current carrying parts is desirable.

The skilled person will therefore understand that many combinations of the inner insulation of the gas nozzle seat are possible dependent on the type of torch, such as with watercooled, gascooled, or aircooled torch tubes.

The gas nozzle of the MIG/MAG-welding torch according to the invention can preferably have the push-on area in the form of a hollow cylinder. But it may also be in the form of a conical hollow space.

Furthermore it can be an advantage that, in using a straining ring, this or constricting ring has on both ends an inner diameter taper or slope of the same angle as the cone of the gas nozzle seat.

The gas nozzle of the welding torch of the invention can consist of copper containing material. In addition to copper different copper alloys such as brass, or bronze, or comparable alloys can be used. If a straining ring is used, this ring consists normally of metal, preferably of steel. It is desired that the coefficient of the thermal expansion of the straining ring is less than that of the gas nozzle.

The invention provides a welding torch system, which shows a gas nozzle with a great surface and without insulation in a direct and constant combination with the gas nozzle seat, whereby this gas nozzle seat is insulated against a torch tube of any type by suitable materials, so that first a remarkable heat transfer is possible between the uninsulated gas nozzle end and the gas nozzles seat and second a high current load of the welding torch is also possible. Furthermore the tightening of the gas nozzle according to the invention by a ring, acting on the end of the gas nozzle with the expansion slits, can be easily handled, is not susceptible to trouble and is very favourable in costs. Another advantage is to be seen in the presence of an inner insulation, which is protected against mechanical damages, which is a special advantage in using oxide ceramics. Last but not least, the type of the torch and/or the gas nozzle can be changed what ever may be desired, to obtain the desired heat flow and the necessary high current, because the system of the welding torch system according to the invention is independent of the type of the torch and of the type of the gas nozzle.

BRIEF DESCRIPTION OF THE DRAWINGS

The invention now is further explained while referring to the FIGS. 1 - 5. The FIGS. 1 and 2 refer to a welding torch with a straining ring and the FIGS. 3 - 5 to a welding torch with a spring ring.

FIG. 1 shows in cross-section a welding torch according to the invention in mounted position.

FIG. 2 shows a welding torch according to FIG. 1 in schematic presentation before being mounted.

FIG. 3 shows in cross-section a welding torch according to the invention in mounted position.

FIG. 4 shows a welding torch according to FIG. 3 in schematic presentation before being mounted.

FIG. 5 shows in top view a preferred embodiment of a spring ring.

DESCRIPTION OF THE PREFERRED EMBODIMENTS

In FIG. 1 the gas nozzle seat 1 consists preferably of a copper alloy. The gas nozzle 2 is advantageously made of copper, brass, bronze, or comparable alloys. The straining ring or clamping ring 5 acts, when the gas nozzle is pushed on the nozzle seat 1. The expansion slits 14, which are not shown in FIG. 1 assure a tight and constant fit on the gas nozzle seat 1. The nozzle seat 1 is insulated against the current carrying torch tube 6 by an insulating layer 9, in this case of ceramics. The ceramics insulation is especially advantageous for the insulation of watercooled torch tubes. Number 3 indicates the usual insulator of the gas nozzle. Numberal 4 is a threaded part. Number 7 is an insulating tube, and numeral 8 is an outer tube part of the torch tube 6. Number 10 indicates the water circulation of this watercooled torch. 11 is the usual antispatter insulator of the torch tube. 12 is the contact tip holder (gas diffuser) and 13 the contact tip. FIG. 2 shows the unfitted parts of the welding torch according to the invention. These parts are as follows: The gas nozzle 2 with its expansion slits, the straining-, lock- or clamp-ring 5, which has on the inside two tapers with an angle corresponding to the angle of inclination of the cone 15, the contact tip 13, the contact tip holder (gas diffuser) 12, the gas nozzle seat 1 with its conical shape of the outer surface 15, and the torch tube 6 together with the insulating tube 7 and its outer tube 8.

The angle of inclination of the cone 15 of the gas nozzles seat 1 is in general between 0.2° and 2.0°, preferred between 0.5° and 1.5°. The insulating tube 7 consists of the usual insulating materials such as Polytetrafluoroethylene (PTFE). The outer tube 8, covering this insulating tube is usually from plastic or metal.

The welding torch of FIG. 3 is nearly the same as shown in FIG. 1. The same numbers are used for the same parts. The torch of FIG. 3 has no straining ring, but a spring ring 5b, which rests in a groove 5a on the gas nozzle and acts on its expansion slits, which are not shown. In this way it assures a tight and constant fit on the gas nozzle seat.

The schematic presentaion of the torch in FIG. 4 corresponds in nearly all details to FIG. 2. Instead of the movable straining ring 5 a spring ring 5b is provided resting in a groove 5a.

FIG. 5 shows an especially preferred spring ring 5b and its open section.

As mentioned before, this invention is not limited to a special gas nozzle and/or a special type of torch. Contrary, it is applicable generally to all well-known apparatus in welding technics.

We claim:

1. The combination comprising a welding torch including a current and coolant carrying torch tube and cable assembly with a coolant receiving gas nozzle seat affixed thereto at one end thereof, a gas nozzle, said nozzle seat having a conically shaped outer diameter surface portion decreasing towards an end of the nozzle seat opposite the torch tube and cable assembly, said nozzle having an attachment end with an inner cylindrical wall received directly around the nozzle seat and in direct contact therewith, said attachment end having expansion slits, the angle of inclination of said outer surface portion and the inner diameter of said inner cylindrical wall of said attachment end being such that said attachment when seated is in a stressed, expanded condition on the nozzle seat and in substantially complete contact with said seat, and a constricting ring received around said nozzle and effective to increase the contact pressure between said seat and said attachment end.

2. The combination of claim 1 including a circumferential insulator positioned between the torch tube and the nozzle seat preventing contact between the torch tube and the nozzle seat.

3. The combination of claim 2 wherein said circumferential insulator is a ceramics material providing electrical insulation and heat transfer.

4. The combination of claim 1 wherein the torch tube and nozzle seat are water cooled.

5. The combination of claim 1 wherein the torch tube and nozzle seat are air cooled.

6. The combination of claim 1 wherein said constricting ring is slideable on the attachment end of said nozzle.

7. The combination of claim 1 wherein said constricting ring is a circumferential expansible spring ring retained on the attachment end of said nozzle.

8. The combination of claim 1 wherein the nozzle is insulated from the end of the coolant carrying torch tube by an insulator.

9. The combination of claim 1 including a plastics insulating tube surrounding the torch tube and an outer tube surrounding the plastics insulation tube.

10. A welding torch member comprising a current and coolant carrying torch tube with a coolant receiving nozzle seat affixed thereto at one end of the tube, a gas nozzle, said nozzle seat having a conically shaped outer diameter surface portion decreasing towards an end of the nozzle seat opposite the torch tube, said outer surface portion having an angle of inclination of from 0.2° to 2.0°, said nozzle having an attachment end with an inner cylindrical wall received directly around the nozzle seat and in direct contact therewith, said attachment end having expansion slits, said angle of inclination of said outer surface portion of said nozzle seat and the inner diameter of said inner cylindrical wall of said attachment end of the nozzle being such that said attachment end when seated is in a stressed, expanded condition on said nozzle seat and in substantially complete contact with such seat, and a constricting ring received around said nozzle and effective to increase the contact pressure between said nozzle seat and said attachment end.

11. The torch member of claim 10 including a circumferential electrical insulator heat transfer tube received around the torch tube and receiving the nozzle seat therearound.

12. The torch member of claim 1 wherein said torch tube and nozzle seat are cooled with water.

* * * * *